Figures 1, 2:
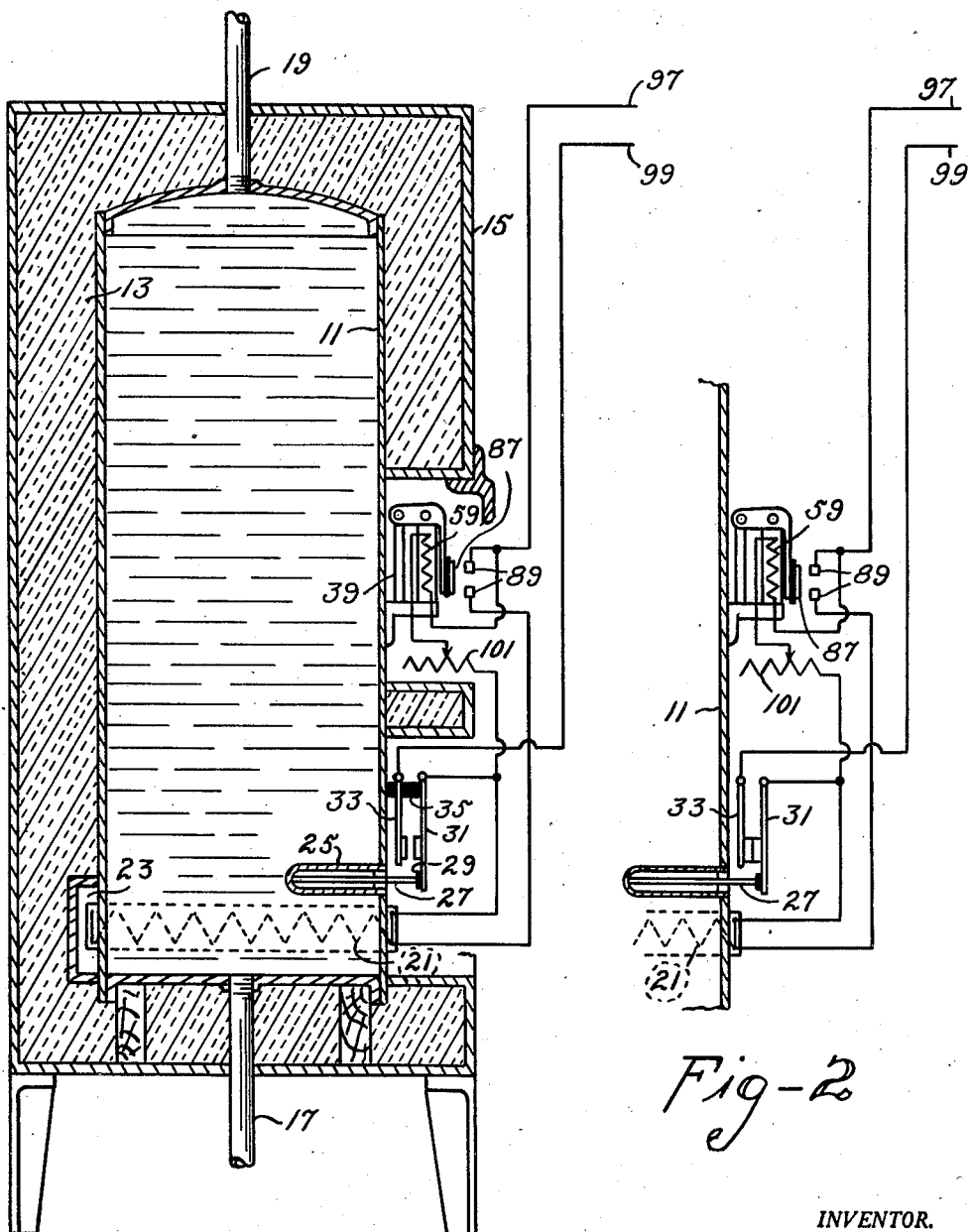

May 8, 1945.　　　C. M. OSTERHELD　　　2,375,380
WATER HEATER CONTROL SYSTEM
Filed Nov. 25, 1943　　　2 Sheets-Sheet 1

INVENTOR.
CLARK M. OSTERHELD
BY
ATTORNEY

May 8, 1945.  C. M. OSTERHELD  2,375,380
WATER HEATER CONTROL SYSTEM
Filed Nov. 25, 1943  2 Sheets-Sheet 2
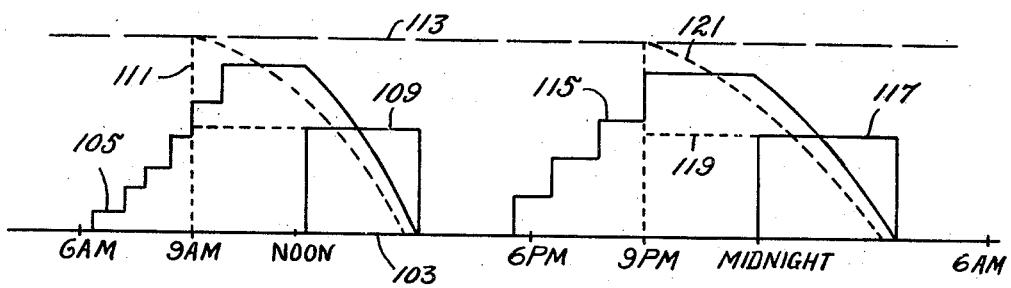
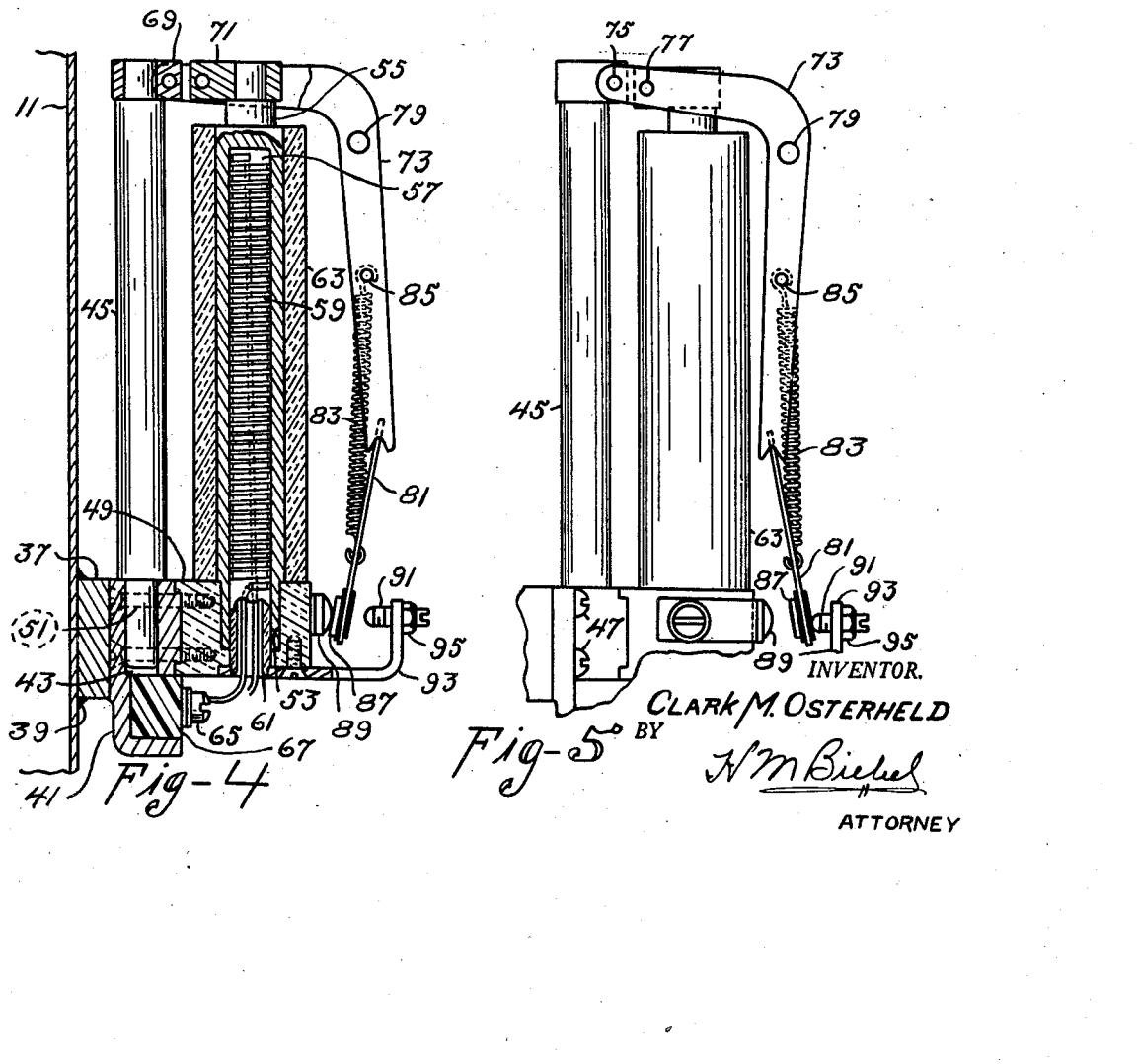
INVENTOR.
CLARK M. OSTERHELD
BY
N. M. Bickel
ATTORNEY Patented May 8, 1945

2,375,380

UNITED STATES PATENT OFFICE 2,375,380

WATER HEATER CONTROL SYSTEM

Clark M. Osterheld, Stoughton, Wis., assignor to McGraw Electric Company, Elgin, Ill., a corporation of Delaware Application November 25, 1943, Serial No. 511,731

25 Claims. (Cl. 219—39)

My invention relates to electric heating systems and particularly to electric water heater control systems.

This invention relates to electrically heated storage water heaters especially adapted for domestic use where the general demand for electric current from the power plant is heavy or "on-peak," as usually stated, for a portion, or portions of the twenty-four hour day, and is relatively light or "off-peak" for another, or other portions of the twenty-four hour day.

In some parts of the country timer controlled switches are used to arbitrarily limit the periods during which certain apparatus, such as electric water heaters, can be connected to the supply line to receive energizing current and, as a rule, the period is arbitrarily made to start when experience has taught that a decline in the demand of current may be expected regularly and to end when or slightly before when like experience has taught that an increase more or less sharp in the demand, may be expected regularly.

One of these periods usually runs from about ten p. m. to six a. m. and includes a period after midnight in which there is a minimum demand and current can be sold cheap in order to measurably even up the load on the generating equipment. Hence, it is a great advantage to heat water for the day's use during this period after midnight, and store it up for withdrawal during the "on-peak" hours. But as a practical measure that alone does not meet all requirements, for in the nature of things some extraordinary withdrawal of hot water will be made each day by a few customers, not always the same, out of many taking current from the same source, and a customer who has an emergency during the "on-peak" hours occasionally should be able to replenish his hot water supply without waiting until after midnight.

As long as the use of current outside of the after midnight period for heating water is confined to a few out of many, the scheme is not upset. Cutting in at ten p. m. after an emergency may be made the privilege of all with the appropriate storage tanks. But those who regularly require water heating at or before ten p. m. may be put to the necessity of increasing their storage tank.

In other parts of the country time switches are not used because the cost is prohibitive or they are otherwise objectionable. But there is still the need to confine the main use of current for such purposes as domestic water heating, to periods in which the demand for other uses is below the maximum, or at a minimum, with a few variations, out of many users.

The principal object of the invention is to provide a control system that will automatically furnish immediate heating when the withdrawal of hot water has been a large part of the supply and, hence, there is a large portion of cold water in the storage tank to be heated or will automatically delay heating when the withdrawal has been but a relatively small part of the supply, and will also automatically make these variations with appropriate relation to the "on-peak" and "off-peak" periods and thus enable the necessary current for most of the heating to be supplied during the hours when the other demands for current are below the peak or at a minimum.

Generally speaking this is accomplished by making the actual water heating depend on the joint and cooperative action of three control means;

First, a first switch for the heater operatively associated with a thermo-sensitive element subject to heat exchange with tank water in the lower portion of the storage tank, which always serves to open that switch when the water in the lower portion of the tank is hot and to close it, or allow it to close when the water in the lower portion of the tank is cold;

Second, a second switch for the heater operatively associated with a thermostatic element subject to heat exchange with water in another portion of the tank and preferably somewhere in the medial portion, and Third, a control device subject to some influence other than the temperature of the water in the tank, such as auxiliary heating, for modifying the action of the second switch and insuring that the heater circuit will not be made operative until a time appropriate to the amount of cold water to be heated for replenishing the normal supply of hot water.

In what is now considered the best practice, the auxiliary control is effected through a small electric heater, well insulated from adjacent parts and cooperating with the thermo-sensitive element subject to tank water temperature between the ends of the tank to regulate and provide the suitable heating period.

In those areas where the power company prefers to use time cut-off switches to arbitrarily limit the period for heating water for domestic use, the three-part control will become operative as soon as the time switch makes the current from the line available and will continue in control to furnish the heat to replenish the supply of hot water at or just safely before the end of the period in which the current is made available.

The three-part control device may be that shown in the present application or it may take other forms operative for the same purpose.

The system disclosed and claimed in the present application has a distinct advantage over the system including a time clock in that an individual heater is given current according to its needs. The power company is still getting off-peak heater operation for this load as a group of, say, a hundred tank heater installations, while the individual variations, say one, two or five, from off-peak operation, is not enough to be objectionable. From the customer's standpoint, if he were subject to time clock control to effect energization of the heater only during off-peak hours, he would not be able to have special capacity on the few occasions when his special need demands it.

An object of my invention is to provide a relatively simple system for controlling the energization of an electric heater for a domestic hot water tank subject to withdrawals of varying quantities of hot water during a twenty-four hour day.

Another object of my invention is to provide a control system for a domestic hot water tank subject to withdrawals of hot water during the day that shall be effective to cause immediate energization of the electric heating means in case of withdrawals of relatively large quantities of hot water and that shall be effective to delay energization of the electric heating means with a preset relatively long time period of delay in case of withdrawal of only nominal quantities of hot water from the tank.

Another object of my invention is to provide a control system for a domestic hot water tank that shall be effective to delay energization of the electric heating means, in case of withdrawal of nominal quantities of hot water during the early morning or forenoon hours and during the late afternoon or early evening hours, until the periods of light load on the supply circuit, occurring usually during the early afternoon and late night hours.

Another object of my invention is to provide a means to replace the time clock switch now being used in water heater control systems.

Other objects of my invention will either be obvious from a description of a preferred embodiment of my control system or will be specifically pointed out in the course of such description and particularly set forth in the appended claims.

In the drawings,

Figure 1 is a view, in vertical section, through a hot water tank having associated therewith the parts comprising my improved control system, Fig. 2 is a diagram of electric circuits under certain operating conditions, Fig. 3 is a graphical diagram showing current flow through the electric heating means relative to the thermal retarder period as controlled by the tank water temperature, Fig. 4 is a sectional view of one form of thermal retarder embodied in my control system showing the parts in the positions occupied by them when the water at an intermediate portion of the tank is cool, and, Fig. 5 is a view in side elevation of the parts shown in Fig. 4, the parts of the device being shown in the positions occupied by them when the water at an intermediate portion of the tank is hot and at the start of a retarder period.

Referring first of all to Figure 1 of the drawings, I have there disclosed a hot water tank 11 which for illustrative purposes is shown as of the usual domestic hot water type used in homes and dwellings. I may provide heat-insulating material 13 therearound, which heat-insulating material is held in place by an outer casing 15. I provide a cold water inlet pipe 17 at the bottom end of the tank. I provide also an upper hot water outlet pipe 19, all in a manner now well known in the art.

I provide further an electric heater 21 which may be of any suitable or desired kind, though I have shown it as being mounted on and around the outside of the tank 11 and positioned in a tunnel member 23.

I provide a first thermally-actuable control switch for said electric heater 21 mounted on the tank at the lower end thereof, and have elected to show it as comprising a tubular member 25 with closed inner end suitably secured in a fluid-tight manner to the wall of the hot water tank 11. An expansion rod 27 is fitted into the tube 25 and normally engages against a small lug or block 29 of electric-insulating material suitably secured to the outer free end of a resilient contact arm 31. The contact arm 31 is adapted to engage with and be disengaged from a relatively rigid contact arm 33, and I have shown the support for the two contact arms 31 and 33 as constituted by a block 35 of electric-insulating material. It is to be understood that the showing of this heater control switch is schematic only and that I may use any structure operative for the same purpose.

At about the middle portion of the tank I mount a thermal retarder heater control switch unit which is disclosed and claimed in my copending application, Serial No. 511,387, filed November 22, 1943, and assigned to the same assignee as is the present application, and only such description thereof will be here given as is necessary to describe the same sufficiently to permit its operating method to be understood.

Referring to Figs. 4 and 5 I have there shown one form of thermal retarder switch unit including a support bracket 37 having an arcuate inner surface corresponding to the arcuate outer surface of tank 11 to which it may be secured as by welding seams 39 or by any other suitable or desired means. Bracket 37 is made of a metal or alloy having high heat-conducting characteristics. A bracket or support 41, of high heat-conducting characteristics has an opening 43 therein to receive the lower reduced end portion of a first high expansion rod 45, which rod, preferably but not necessarily is supported by bracket 41 substantially parallel to the axis of tank 11. Support 41 may be held as by screws 47 against bracket 37.

A bracket 49, of heat-insulating material, is secured against bracket 41 as by screws 51. Bracket 49 has an aperture 53 therein to receive the lower reduced end portion of a second expansion rod 55, which rod has a lesser thermal expansivity than rod 45 and which may be made of a nickel steel alloy. It is to be understood that rods 45 and 55 have their lower ends held rigidly in their brackets in any suitable or desired manner. A bore 57 extends from the lower end of rod 55 up to almost its upper end and an electric heating coil 59 is positioned within the bore 57 as by being wound on a rod 61 of electric-insulating material. A casing 63, of heat-insulating material surrounds the rod 55 to make it more or less independent thermally of the temperature of the ambient air, to permit of the use of relatively low wattage heating coil 59 and to heat insulate the other parts of the retarder switch unit therefrom. The end portions of coil 59 are connected to terminals 65 mounted on a block 67 of electric-insulating material, which block may be supported by bracket 41.

The upper reduced end portion of rod 45 has rigidly mounted thereon a short laterally-extending arm 69 and the upper reduced end portion of rod 55 has rigidly mounted thereon a short laterally-extending arm 71, the two arms 69 and 71 extending toward each other with their adjacent ends spaced apart. An upper toggle member 73, of substantially L-shape, consists of two similar arms and the upper horizontally-extending portions are pivotally supported on arms 69 and 71 as by short pivot trunnions 75 and 77. A spacer rod 79 secures the upper parts of the vertical portions of upper toggle member 73 into proper operative positions relative to each other. A lower toggle member 81 has pivotal engagement of its upper end with the lower end of toggle member 73 and an over center spring 83 has its upper end connected with a cross bar 85 in the upper toggle member 73 and its lower end connected with an intermediate part of the lower toggle member 81 to cause snap acting movement of the lower toggle member, all in a manner now well known in the art. A contact bridging member 87 is insulatedly supported at the lower end portion of toggle member 81 and is adapted to be moved into engagement with and be disengaged from a pair of fixed contact members 89 supported on and by block 49. A stop member 91 is provided for toggle member 81, the stop being in the shape of a screw 91 having screw threaded engagement with a bracket 93 and a lock nut 95 being provided on screw 91 to permit of adjustably holding the stop screw 91 in any desired or required position.

In the positions occupied by the parts as shown in Fig. 4 of the drawings the temperature of the first expansion rod 45 is substantially the same as the temperature of the second expansion rod 55, both being on the order of 70° F., and therefore the lengths of the two arms will be substantially the same and the design, construction and adjustment of the parts of the toggle switch is such that the contact bridge member 87 will be in electrical engagement with the pair of contact members 89.

In case the first expansion rod 45, which is connected to the tank by the supporting block 37, is subject to the temperature of hot water in the tank, on the order of 150° F., its length will be greater than that of rod 55, so that the free end of arm 81 and particularly the contact bridging member 87 will be moved out of engagement with contact members 89, and arm 81 will be in operative engagement with stop member 91, all as shown in Fig. 5 of the drawings.

As was hereinbefore stated the parts of my control system shown in Fig. 1 of the drawings are in the position they will occupy when all of the water in the tank is hot so that expansion rod 45 will be elongated until the contact bridge member 87 is out of engagement with the pair of contact members 89. Further, the expansion rod 27 will also be elongated until engagement by the contact arms 31 and 33 will be broken and therefore the heating means 21 will not be energized from a supply circuit including lines 97 and 99.

It is here pointed out that the electric heating means 21 is connected in series electric circuit with the lower thermally-actuable switch and particularly the contact arms 31 and 33 as well as with the contact members 89 of the thermal retarder heater control switch unit.

Referring now to Fig. 3 I have there shown a twenty-four hour period on a base line 103. In the average home or household someone, perhaps the man of the house, will get up at around 6:30 a. m. and draw on the hot water tank for a small amount of hot water as shown by the first step of the full line curve 105. The vertical distance between the line 103 and line 105 may represent the amount of cold water in the tank and the vertical distance between the curve 105 and an upper base line 107 may represent the amount of hot water still in the tank. Further withdrawals of small quantities of hot water may occur until say 9 a. m. or 10 a. m. When the amount of hot water withdrawn from the tank is sufficient to cause the tube 25 of the lower heater control switch to be subject to cold water, it will close and thereby cause energization of the small heating coil 59 and the temperature of the second expansion rod 55 will be raised slowly. This will continue for four or five hours when the temperature of rod 55 will have reached say 300° F. and its length will have increased to a value causing closure of the thermal retarder heater control switch at say 12:30 p. m. or so and energization of the heater 21 which energization will continue until substantially all of the water in the tank is hot, when the lower heater control switch will open and deenergize the heater. The full line 109 may represent the current curve.

The above described operation will occur independent of withdrawals of additional small quantities of hot water so long as such withdrawals do not cause the thermal retarder and particularly the first expansion rod to become subject to cold water. If, however, an abnormal amount of hot water is withdrawn from the tank, at say 9 a. m., as shown by the broken line 111 so that the amount of hot water remaining in the tank is represented by the line 113, the first expansion rod 45 will be subjected to the temperature of cold water, its length will be quickly decreased with attendant closure of the switch and immediate energization of the electric heater 21.

Referring now to Fig. 2 of the drawings I have there shown contact arm 31 in engagement with contact arm 33 because of the fact that expansion rod 27 is shortened by reason of its being subject to the temperature of cold water in the lower end portion of the tank. The small electric heating coil 59 in the thermal retarder unit has one of its ends connected with supply circuit conductor 97 while its other end is connected to one terminal of an adjustable rheostat 101, the other terminal of which is connected to contact arm 31 and to one terminal of heater 21. When contact arms 31 and 33 are in engagement with each other, as shown in Fig. 2, an energizing circuit will be closed through the small heater 59 and the design, construction and adjustment of the thermal retarder unit is such that the length of time required for the heat generated in the small heater 59 to cause sufficient linear expansion of the second expansion rod 55 to the extent that the contact bridge member 87 will be moved into engagement with contact members 89 is on the order of four to six hours. I have illustrated one method of varying the time period of delay by use of an adjustable rheostat 101 which may be manually adjusted to obtain the desired time period of delay, although other methods and means to obtain the same result may be employed.

Energization of the electric heating means 21 will continue for a time period which occurs at substantially that part of the day, that is in the early afternoon, when the usual or ordinary demands for current on the supply circuits is relatively small or what might be termed during the day off-peak period. It is of course to be understood that the length of time of energization of the heating means 21 is in accordance with the amount of cold water in the tank and heater 21 is deenergized by action of the lower thermal switch.

At or about 5:30 to 6:00 p. m. supper is usually in course of preparation and hot water will be demanded as is shown by the stepped curve 115 in the right hand end portion of Fig. 3. When enough hot water has been withdrawn from the tank to subject the lower thermally-actuable switch to cold water, heating coil 59 is again energized; and, at the end of a pre-set adjustable time period, current will again flow through electric heating means 21 through the two contact arms 31 and 33 and through fixed contacts 89 and the contact bridge member 87. If it be assumed that by about 7:00 o'clock in the evening the lower thermally actuable switch was subject to cold water such energization will start at or about midnight as is shown by the current curve 117.

Should abnormal demands for hot water be made early in the evening so that the amount of hot water withdrawn from the tank is such that the thermal retarder switch unit is subject to cold water at say about 9 p. m., energization of the heating means 21 will start immediately as shown by the current curve 119 in broken lines and the amount of hot water withdrawn being more than half of the tank-full as shown by the dashed line 121.

It is again to be understood that the design, construction and adjustment of the various parts of the thermal retarder switch unit is such that the average home having electric water heating and going through the usual normal routine, will cause energization of the electric heating means for the tank during the off-peak periods occurring usually during the early afternoon hours and during the late night hours and ending say at 6 a. m. The length of time of energization of the electric heating means is of course dependent upon the amount of cold water in the tank, but as stated above, the design, construction and adjustment of the various parts of the system are such that the tank will be substantially filled with hot water before the usual on-peak periods. If because of an abnormal demand during the late night hours more than half of the tank-full of hot water was withdrawn, energization of the heater would continue until substantially all of the water in the tank is hot.

It is of course obvious that there are always exceptions in any community to the ordinary normal living routine but when a relatively large number of homes have electrically-heated hot water tanks it is obvious that slight variations of the average normal habits and routine will tend to equalize each other, and such few cases as may occur will, as has already been hereinbefore pointed out, be unobjectionable.

The control system embodying my invention thus dispenses with the need of a timing means which cuts off the current during the on-peak periods of heavy demand and permits energization of the electric heating means during the off-peak periods and depends more particularly upon the ordinary habits of the people as regards the use of hot water. When it is found that one family is very abnormal in its demands for hot water it is relatively easy to install say a larger tank instead of the one of more or less standard capacity so that the control system embodying my invention can be adjusted to the habits of the few families who do not follow the usual normal routine.

The control system embodying my invention thus provides a means replacing the off-peak timer-controlled switch, the use of which is attended by serious limitations. One of the most serious limitations of a timer controlled switch is that it stops when the supply of current is interrupted, so that in case of one long or several short interruptions, the off-peak period provided by such a switch will not occur at the proper time. The cost of such timer-controlled switch is also much greater than that of my thermal retarder.

Changes may be made in the details and if within the scope of the claims, are to be considered as being covered thereby.

I claim as my invention:

1. A control system for an electric heater for a hot water tank adapted to be connected to an electric supply circuit having low load demands during the early afternoon and the late night hours, said system including a thermal retarder heater control switch unit adapted to be subject to tank water temperature intermediate the ends of the tank and having an electric heating coil, a thermally-actuable heater control switch subject to tank water temperature at the lower end of the tank and adapted to be closed when a sufficient quantity of hot water has been used in the morning and in the early evening to subject only said thermally-actuable switch to cold water to energize said heating coil and cause closure of said thermal retarder switch with a period of time delay after start of energization of said heating coil to bring the closure into the early afternoon and during the night hours.

2. A control system for an electric heater for a hot water tank adapted to be connected to an electric supply circuit having low load demands during the early afternoon and the late night hours, said system including a thermal retarder heater control switch unit adapted to be subject to tank water temperature intermediate the ends of the tank and having an electric heating coil, a thermally-actuable heater control switch subject to tank water temperature at the lower end of the tank and adapted to be closed when a sufficient quantity of hot water has been used in the morning and in the early evening to subject only said thermally-actuable switch to cold water to energize said heating coil and cause closure of said thermal retarder switch with a period of time delay after start of energization of said heating coil to bring the closure into the early afternoon and during the night hours, said thermally-actuable switch being effective to deenergize said heater when substantially all of the water in the tank is hot.

3. A control system for a hot water tank having an electric heater, comprising a thermally-actuable heater control switch subject to tank water temperature at the lower portion of the tank and a thermal retarder heater control switch unit mounted in heat-conducting relation to the tank intermediate its ends and comprising two dissimilarly thermally-expansible elements.

4. A control system for an electrically operated storage water heater having an electric heater, comprising a thermally-responsive heater control switch subject to tank water temperature at the lower portion of the tank and a thermal-retarder heater control switch unit including a first thermo-sensitive element adapted to be mounted in heat-conducting relation to the tank intermediate its ends and a second thermo-sensitive element subject to heat exchange applied independent of the tank water.

5. A control system for an electrically operated storage water heater having an electric heater, comprising a thermally-responsive heater control switch subject to tank water temperature at the lower end of the tank and a thermal retarder heater control switch unit including a first thermo-sensitive element adapted to be mounted in heat-conducting relation to the tank intermediate its ends, a second thermo-sensitive element subject to heat exchange applied independent of the tank water and auxiliary means for heat exchange with said second element controlled by said thermally-responsive switch.

6. A control system for an electrically operated storage water heater having an electric heater, comprising a thermally-responsive heater control switch subject to tank water temperature at the lower end of the tank and a thermal retarder heater control switch unit including a first thermo-sensitive element adapted to be mounted in heat-conducting relation to the tank intermediate its ends, a second thermo-sensitive element subject to heat exchange applied independent of the tank water and an auxiliary heater for said second element controlled by said thermally-responsive switch in accordance with the temperature of the water at the lower end of the tank.

7. A control system for an electrically operated storage water heater having an electric heater, comprising a thermally-responsive heater control switch subject to tank water temperature at the lower end of the tank and a thermal-retarder heater control switch unit comprising two dissimilarly thermally-responsive elements, one of said elements being adapted to be mounted in heat-conducting relation to the tank intermediate the ends thereof, the other of said elements being subject to heating applied independent of tank water and a heating coil for heating the other element, the energization of said heating coil being controlled by said thermally-responsive heater control switch.

8. A control system for an electrically operated storage water heater, comprising a heater circuit for connection to a supply line, a thermally-responsive heater control switch for the circuit subject to tank water temperature at the lower end of the tank, a thermal retarder heater control switch unit for the circuit including a thermo-sensitive element adapted to be subject to heat exchange with the tank water intermediate the ends of the tank and heat control means operated by power from the circuit for modifying the effect of the thermo-sensitive element to vary the operation of the retarder switch.

9. A control system for an electrically operated storage water heater, comprising a heater circuit for connection to a supply line, a thermally-responsive heater control switch for the circuit subject to tank water temperature at the lower end of the tank, a thermal retarder heater control switch unit for the circuit including a thermo-sensitive element adapted to be subject to heat exchange with the tank water intermediate the ends of the tank and heat control means operated by power from the circuit and controlled by the thermally-responsive switch for modifying the effect of the thermo-sensitive element to vary the operation of the retarder switch.

10. A control system for the heater of a hot water tank, including a thermally-responsive heater control switch subject to tank water temperature at the lower portion of the tank and a thermal retarder heater control switch unit comprising a first thermo-sensitive element adapted to be subject to heat exchange with tank water intermediate the ends of the tank a second thermo-sensitive element subject to heat exchange applied independent of the tank water and auxiliary means for heat exchange with the second element.

11. In an off-peak heating system for heating tap water during periods of each day when the demand for electric energy is reduced, comprising an electric heater for the tank, two thermally-actuable switches jointly effective to control the energization of said electric tank heater, the first of said switches being adapted to be subject to tank water temperature near the lower end of the tank, said second switch being adapted to be subject to tank water temperature intermediate the ends of the tank, said second switch being thermally controlled by said first switch to be moved into position to energize said heater during an off-peak period in case of entry into the tank during a period when demand for electric energy is normal, of sufficient cold water to affect only said first switch.

12. A control system for a hot water tank having an electric heater, comprising a thermally-actuable heater control switch adapted to be subject to tank water temperature at the lower end of the tank and adapted to be closed when subject to cold water temperature and a thermal retarder heater control switch unit adapted to be subject to tank water temperature intermediate the ends of the tank and electrically controlled by said thermally-actuable switch, said two switches being jointly effective to effect energization of said electric heater a predetermined period of time after entry of enough cold water into the tank to reach said thermally-actuable switch.

13. A control system for an electrically operated storage tank having an electric heater, comprising a heater circuit for connection to an electric supply line having off-peak periods in the early afternoon and during the late night hours, a thermally-responsive heater control switch adapted to be subject to tank water temperature at the lower end portion of the tank and to be closed when subject to cold water, a thermal retarder heater control switch unit comprising a first thermo-sensitive element adapted for heat exchange with tank water intermediate the ends of the tank, a second thermo-sensitive element subject to heating applied independently of tank water and heating means for said second element operated by power from the circuit and controlled by said thermally-responsive switch, said two heater control switches being jointly effective to energize said electric heater with an adjustably predetermined time delay period after subjection of only said thermally-actuable switch to cold water, said time delay period being such as to bring the energization into an off-peak period.

14. A control system for an electrically operated storage tank having an electric heater, comprising a heater circuit for connection to an electric supply line having off-peak periods in the early afternoon and during the late night hours, a thermally-responsive heater control switch adapted to be subject to tank water temperature at the lower end portion of the tank and to be closed when subject to cold water, a thermal retarder heater control switch unit comprising a first thermo-sensitive element adapted for heat exchange with tank water intermediate the ends of the tank, a second thermo-sensitive element subject to heating applied independently of tank water and heating means for said second element operated by power from the circuit and controlled by said thermally-responsive switch, said two heater control switches being jointly effective to energize said electric heater with an adjustably predetermined time delay period after subjection of only said thermally-actuable switch to cold water, said time delay period being such as to bring the energization into an off-peak period, said thermally-actuable heater control switch being effective to deenergize said electric heater when substantially all of the water in the tank is hot.

15. A control system for a hot water tank having an electric heater and being subject to withdrawal of varying quantities of hot water during a twenty-four hour day, said heater being adapted to be connected to an electric supply circuit having off-peak periods during early afternoon and during late night hours, said system comprising a thermal-retarder heater control switch unit including a first thermo-sensitive element subject to heat exchange with tank water intermediate the ends of the tank, a second thermo-sensitive element cooperating with the first element to vary the opening and closing of the heater-control switch and operated by power from the circuit and a thermally-actuable heater control switch subject to tank water temperature at the lower end of the tank and adapted to be closed when subject to cold water and controlling the power for said second element, said two heater control switches being jointly effective to cause energization of said electric heater immediately after withdrawal of enough hot water from the tank to cause the first element of the thermal retarder unit to be subject to cold water and to cause energization of said electric heater with a time period of delay after withdrawal of only enough hot water during on-peak periods to subject only said thermally-actuable switch to cold water, said delay period being long enough to cause the energization to start during an off-peak period.

16. A control system for a hot water tank having an electric heater and being subject to withdrawal of varying quantities of hot water during a twenty-four hour day, said heater being adapted to be connected to an electric supply circuit having off-peak periods during early afternoon and during late night hours, said system comprising a thermal-retarder heater control switch unit including a first thermo-sensitive element subject to heat exchange with tank water intermediate the ends of the tank, a second thermo-sensitive element cooperating with the first element to vary the opening and closing of the heater-control switch and operated by power from the circuit and a thermally-actuable heater control switch subject to tank water temperature at the lower end of the tank and adapted to be closed when subject to cold water and controlling the power for said second element, said two heater control switches being jointly effective to cause energization of said electric heater immediately after withdrawal of enough hot water from the tank to cause the first element of the thermal retarder unit to be subject to cold water and to cause energization of said electric heater with a time period of delay after withdrawal of only enough hot water during on-peak periods to subject only said thermally-actuable switch to cold water, said delay period being long enough to cause the energization to start during an off-peak period, said thermally-actuable heater control switch being effective to deenergize said electric heater when substantially all of the water in the tank is hot.

17. A control system for a hot water tank having a cold water inlet at the lower end of the tank and a hot water outlet at the upper end of the tank and being subject to withdrawals of varying quantities of hot water during a twenty-four hour day, comprising an electric heater for the tank adapted to be connected to an electric supply circuit having off-peak periods during early afternoon and late night hours, a thermally-actuable heater control switch adapted to be subject to tank water temperature at the lower end of the tank and adapted to be in closed position when subject to cold water, a thermal retarder heater control switch unit including a first thermo-sensitive unit subject to heat exchange with tank water intermediate the ends of the tank, a second thermo-sensitive element subject to heat exchange means independent of the tank water and operated by power from the circuit when the thermally-actuable switch is closed to be closed thereby with a predetermined time delay period to cause energization of said electric heater, after withdrawal of enough hot water during early morning and during early evening hours to subject only said thermally-actuable switch to cold water, said energization taking place during the early afternoon and during the late night off-peak periods respectively.

18. A control system for an electric heater for a hot water tank, comprising a thermally-responsive heater control switch subject to tank water temperature at the lower end of the tank and adapted to be closed when subject to cold water and a thermal retarder heater control switch unit connected in series circuit with said thermally-responsive switch and including a first thermo-sensitive element adapted to be mounted in heat-conducting relation to the tank intermediate the ends thereof, a second thermo-sensitive element subject to heat exchange applied independent of the tank water, a switch arm actuable by said two elements and an auxiliary electric heating coil for said second element controlled by said thermally-responsive switch, said two heater control switches being in closed position to effect immediate energization of said electric heater upon the filling of said tank with cold water.

19. A control system for an electric heater for a hot water tank subject to withdrawals of varying quantities of hot water during a twenty-four hour day, comprising a thermally-responsive heater control switch subject to tank water temperature at the lower end of the tank and adapted to be closed when subject to cold water and a thermal-retarder heater control switch unit connected in series electric circuit with said thermally-responsive switch and including a high-expansion thermo-sensitive element adapted to be mounted in heat-conducting relation to the tank intermediate the ends thereof, a low-expansion thermo-sensitive element subject to heat exchange applied independent of the tank water, a switch arm actuable by said two elements and an auxiliary heating coil for said second element controlled by said thermally-responsive switch, said two heater control switches being moved substantially immediately to closed position to effect energization of said heater after withdrawal of substantially all of the hot water from the tank and entry of a corresponding amount of cold water into the tank.

20. A control system for an electric heater for a hot water tank subject to withdrawals of varying quantities of hot water during a twenty-four hour day, comprising a thermally-responsive heater control switch subject to tank water temperature at the lower end of the tank and adapted to be closed when subject to cold water and a thermal-retarder heater control switch unit connected in series electric circuit with said thermally-responsive switch and including a high-expansion thermo-sensitive element adapted to be mounted in heat-conducting relation to the tank intermediate the ends thereof, a low-expansion thermo-sensitive element subject to heat exchange applied independent of the tank water, a switch arm actuable by said two elements and an auxiliary heating coil for said second element controlled by said thermally-responsive switch, said two heater control switches being moved substantially immediately to closed position to effect energization of said heater after withdrawal of enough hot water from the tank and entry of a corresponding amount of cold water into the tank, to subject said low-expansion element of the thermal retarder switch to cold water.

21. A control system as set forth in claim 12 and including means for varying said predetermined period of time.

22. A control system as set forth in claim 12 and including manually-adjustable means for varying said predetermined period of time.

23. A control system as set forth in claim 12 and including manually-adjustable means for varying the length of said time period of delay to cause energization of said heater to start at a predetermined time of an off-peak period.

24. A control system for an electrically operated storage water heater having an electric heater, comprising a thermally-responsive heater control switch subject to tank water temperature at the lower end of the tank and a thermal-retarder heater control switch unit comprising two dissimilarly thermally-responsive elements, one of said elements being adapted to be mounted in heat-conducting relation to the tank intermediate the ends thereof, the other of said elements being subject to heating applied independent of tank water and a heating coil for heating the other element, the energization of said heating coil being controlled by said thermally-responsive heater control switch, said thermal-retarder switch being effective to cause immediate energization of said heater in case of withdrawal of enough hot water from the tank to cause entry of enough cold water into the tank to subject both switches to cold water and to prevent energization of said heater until after the elapse of a predeterminated length of time after the entry of only enough cold water into the tank to subject the thermally-responsive switch to cold water.

25. A control system for a hot water tank having an electric heater, comprising a thermally-actuable heater control switch adapted to be subject to tank water temperature at the lower end of the tank and adapted to be closed when subject to cold water temperature and a thermal retarder heater control switch unit adapted to be subject to tank water temperature intermediate the ends of the tank and electrically controlled by said thermally-actuable switch, said thermal retarder switch being effective to cause immediate energization of said heater in case of withdrawal of enough hot water from the tank to cause entry of enough cold water into the tank to subject both switches to cold water and to prevent energization of said heater until after the elapse of a predetermined length of time after the entry of only enough cold water into the tank to subject the thermally-responsive switch to cold water.

CLARK M. OSTERHELD.